US 6,633,434 B2

(12) United States Patent
Hollander

(10) Patent No.: US 6,633,434 B2
(45) Date of Patent: Oct. 14, 2003

(54) LASER SIGHTING BEAM MODIFICATION FOR MEASURING OR TREATMENT INSTRUMENT

(76) Inventor: Milton Bernard Hollander, One Arbor Rd., Stamford, CT (US) 06907

( * ) Notice: Subject to any disclaimer, the term of this patent is extended or adjusted under 35 U.S.C. 154(b) by 0 days.

(21) Appl. No.: 10/073,805

(22) Filed: Feb. 11, 2002

(65) Prior Publication Data

US 2002/0146045 A1 Oct. 10, 2002

Related U.S. Application Data

(62) Division of application No. 09/605,330, filed on Jun. 27, 2000, now Pat. No. 6,377,400.
(60) Provisional application No. 60/142,070, filed on Jul. 2, 1999, provisional application No. 60/147,021, filed on Aug. 3, 1999, provisional application No. 60/154,591, filed on Sep. 17, 1999, provisional application No. 60/185,388, filed on Feb. 28, 2000, and provisional application No. 60/198,384, filed on Apr. 19, 2000.

(51) Int. Cl.[7] .............................. G02B 27/10; G01J 5/00
(52) U.S. Cl. ..................... 359/618; 359/629; 374/121
(58) Field of Search ................. 359/618, 629; 347/121; 356/50; 33/365; 374/121, 130, 141

(56) References Cited

U.S. PATENT DOCUMENTS

| | | | | | |
|---|---|---|---|---|---|
| 4,315,150 | A | * | 2/1982 | Darringer et al. | 250/338.1 |
| 4,494,881 | A | * | 1/1985 | Everest | 374/124 |
| 5,368,392 | A | * | 11/1994 | Hollander et al. | 374/121 |
| 5,524,984 | A | * | 6/1996 | Hollander et al. | 374/121 |
| 6,183,129 | B1 | * | 2/2001 | Aoyama et al. | 374/121 |
| 6,377,400 | B1 | * | 4/2002 | Hollander | 359/618 |
| 5,524,984 | C1 | * | 5/2002 | Hollander et al. | 374/121 |

* cited by examiner

Primary Examiner—Ricky Mack
(74) Attorney, Agent, or Firm—William A. Drucker

(57) ABSTRACT

The invention relates to modification of a laser beam produced, for purposes of aiming at a target, by instruments for measuring, controlling and treatment, such as pyrometers.

The invention further provides methods, for aiming of such an instrument at a target by use of a single beam, and splitting the aiming beam into fractional beams for defining a selected area of the target, and particularly as an automatically repeated action, the fractional beams being directed, for example, to indicate points on the target bounding a selected area thereof, or again being directed at successive shifted points bounding the selected area of the target, or yet again with the fractional beams being merged to define a closed loop area of the target.

15 Claims, 11 Drawing Sheets

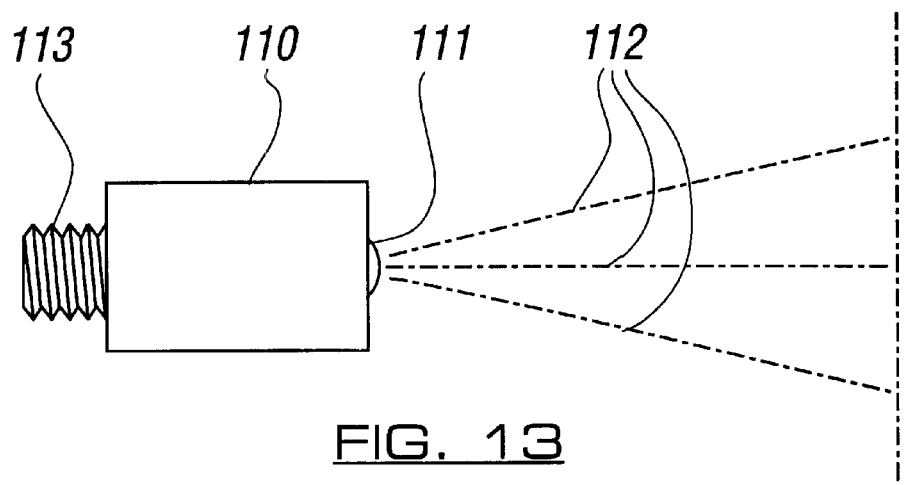
FIG. 13
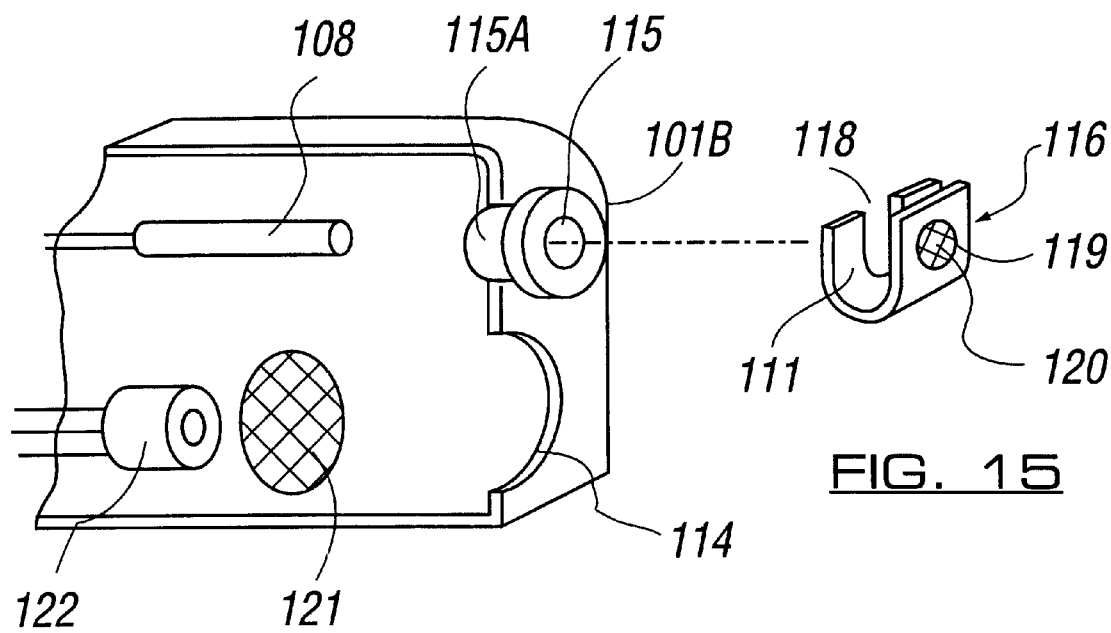
FIG. 14
FIG. 15

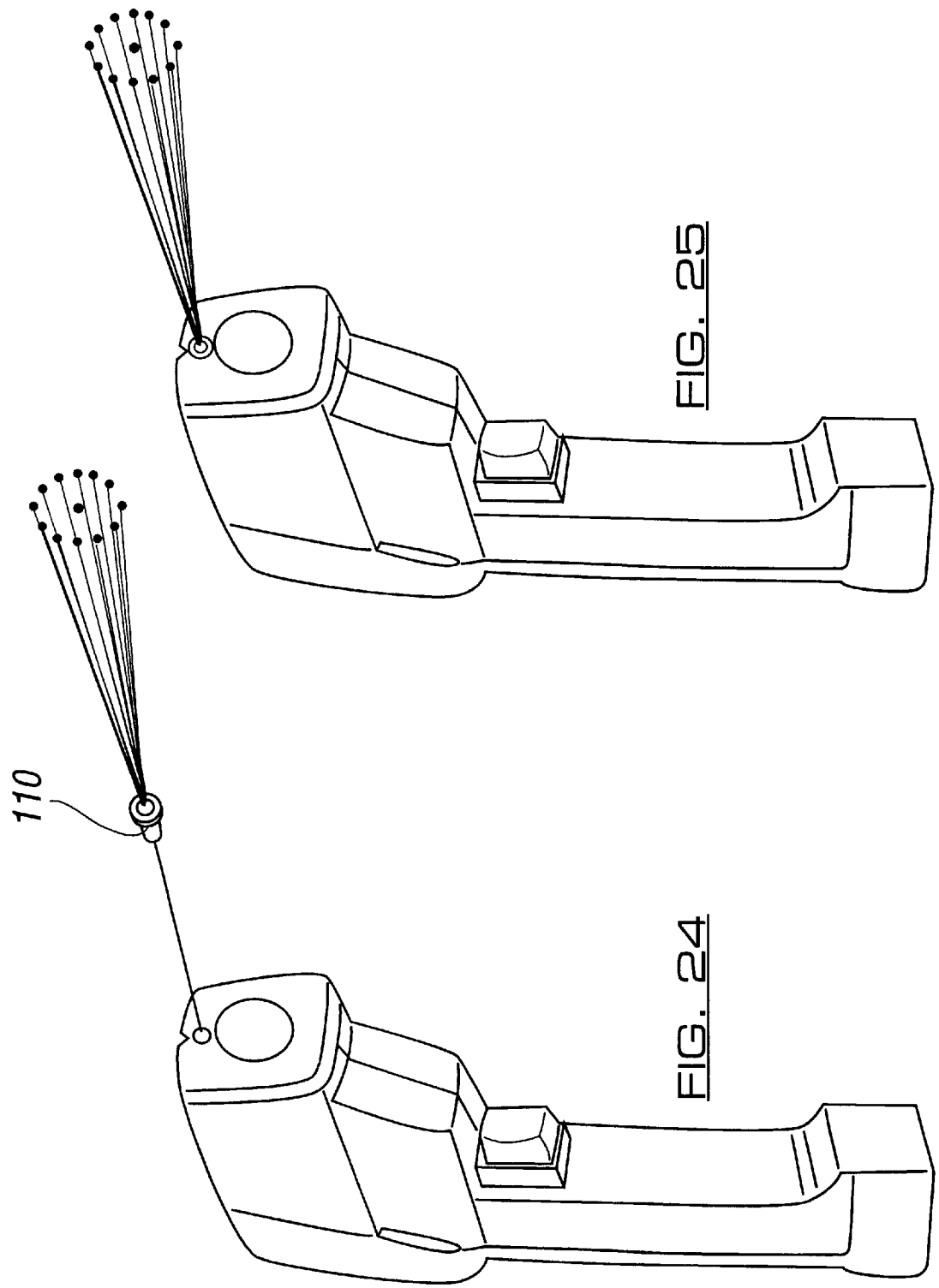

LASER SIGHTING BEAM MODIFICATION FOR MEASURING OR TREATMENT INSTRUMENT

This is a division of application Ser. No. 09/605,330 filed Jun. 27, 2000, now U.S. Pat. No. 6,377,400, which is a continuation-in-part of my co-pending U.S. Patent Applications Ser. No. 60/142,070 filed Jul. 2, 1999 "Measuring instrument with laser sighting", Ser. No. 60/147,021 filed Aug. 3, 1999 "Measuring or treatment instrument with laser sighting Ser. No. 60/154,591 filed Sep. 17, 1999 "Measuring or treatment instrument with laser sighting Ser. No. 60/185,385 filed Feb. 28, 2000 "Variable laser beam projection"

Ser. No. 60/198,384 filed Apr. 19, 2000 "Measuring or treatment instrument with laser sighting"

BACKGROUND OF THE INVENTION

1. Field of the Invention

The invention relates to the field of measuring, controlling and treatment instruments, such as for example instruments for measuring the temperature of a surface at a distance, which utilise a laser-generated beam for the purpose of striking a surface or other target and thereby indicating to the user that the instrument is properly aligned. It is known in the art of laser-aimed instruments to project a single, i.e. central laser beam to create a spot of laser light on the target at a desired central point of the area of the target under investigation or treatment.

It is also known in the art of laser aimed instruments to utilise a beam splitting means which causes a single laser beam to be split into a plurality of beams which are, for example equally spaced about a central axis and at the same radium from the axis, so that a plurality of light spots are formed on the target around an area of the target and can serve to outline that area for investigation.

When a single laser beam is used for the production, by splitting, of a plurality of spaced beams to form a pattern on a target, there is a diminishing of the intensity of the split beams which become very much dimmer after a single generated laser beam is subsequently split, e.g. as by a diffraction beam splitter. Thus a single central beam may well be sufficient in intensity to illuminate a central spot on a target at a distance, but if that same single laser beam is split into, for example, twelve fractional beams intended for producing a pattern of spots of light on the target, the intensity of those fractional beams will be only about one twelfth of the single central beam. Thus, at a comparable distance from the laser the fractional beams may be difficult or impossible to see by the user of the instrument, particularly in poor ambient light conditions.

The invention further relates generally to the projection of laser beams for the directional aiming of apparatus, such as radiometer instruments, which may be used for ascertaining the temperature of a surface using infra-red measurement techniques, and more particularly to such apparatus which utilises a laser sighting device which is adapted to project one or more laser sighting beams onto a target for defining on the surface of the target an energy zone thereof, the temperature of which is to be measured.

It is necessary to be able to match the area-to-distance ratio is expressed as 20:1, it represents an energy zone diameter of one foot at a distance of twenty feet away at right angles. A less sensitive and less costly device may have an area-to-distance ratio of 6:1 where the diameter of the energy zone is one foot at a distance of six feet. The area of the energy zone is defined as where 90% of the energy is found and collected.

There can be times when the use of only a single laser beam is required, for example when it is desired to enter a measuring apparatus with the center of a surface to be investigated. There are also other instances where it is desired to define, on the surface to be investigated, points on the periphery of an area, such as a circle, and for this purpose there can be used a laser beam projector which is provided with a beam splitter device arranged to project, onto the surface to be investigated, a pattern of laser light spots arranged in, for example, a circle. Hitherto it has been necessary to utilise separate laser projection instruments for single-spot and multiple-spot projection systems, to permit the projection of any selected one of a number of multiple spot patterns.

OBJECTS OF THE INVENTION

It is accordingly a primary object of the invention to provide an improved laser beam aiming, guiding or sighting means, for use in conjunction with a measuring or control instrument, which permits changing of the production of the laser beam from a smaller number of beams to a larger number of beams, and vice versa, from time to time such that the smaller number of beams, which are of relatively greater intensity, permit the user of the instrument to see where the smaller number of beams is striking the target, and more clearly because of the relatively greater beam intensity, and subsequently to utilise the larger number of beams to online a desired area of the target, the general location of that area of the target being known to the user, even if the illumination by the larger number of beams is considerably fainter, because the user will have had the advantage of seeing the target area pinpointed by the smaller number of beams.

Another object of the invention is to provide a laser beam generating means, for use in conjunction with a measuring or control instrument, which permits changing of the beam production from a first state in which there is a single central beam of relatively greater intensity to a second state in which there is a plurality of fractional beams, of relatively lesser intensity, for example to outline an area of a target.

Yet another object is to provide beam splitter means which are readily movable at the will of the user for placing into and out of the line of a single laser beam.

Yet another object is to provide means for timed duration of projection of each display of laser beams.

Yet another object is to provide means for automatic alternation of different kinds of beam projection, such that the user has the target area essentially continuously and repetitively illuminated by the single central beam and the plurality of fractional beams defining an area of the target.

Yet another object is to provide the combination of a measuring, control, or treatment instrument and a laser beam projecting means having the characteristics set forth in the foregoing objects.

A still further object is to provide an instrument in which a switching means, serving to change the beam projection from a lesser number of beams to a greater number of beams, and vice versa, serves to cause projection of a number of beams which produce a desired pattern, which may be varied either at the will of the user, or from time to time automatically, or both, on a target area.

Yet another object of the invention is to provide a device which permits aiming, guiding, or sighting of a beam or beams for purposes other than temperature sensing purposes, such as for decorative and/or entertainment purposes, or activation of apparatus, or for health treatments.

SUMMARY OF THE INVENTION

According to a first aspect of the present invention there is provided a laser generating means, for use in conjunction with a measuring, controlling or treatment instrument, which permits changing, manually or mechanically or electronically projected laser light from a lesser number, for example a single central beam, to a larger number of beams utilised to define an area of a target centered on the point defined by the single central beam.

According to a second aspect of the invention there is provided a measuring instrument, for example an instrument for measuring the temperature of a target situated at a distance from the measuring instrument, which includes thereon a laser generating means as set forth in the preceding paragraph.

According to a third aspect of the present invention there is provided a beam changing means, for a laser-generating instrument, which is in the form of a separable attachment.

BRIEF DESCRIPTION OF THE DRAWINGS

In the drawings:

FIGS. 12 and 13 illustrate a first embodiment of beam projection apparatus in accordance with the invention, FIG. 12 being a front elevation of a pistol-type laser beam projector and FIG. 13 being a side elevation of a first form of beam production member for engagement in the laser beam projector;

FIGS. 14 and 15 illustrate a second embodiment of beam projection apparatus in accordance with the invention, FIG. 14 being a partial side elevation of a pistol-type laser beam projector, and FIG. 15 being a perspective elevation of a second form of beam production member for engagement onto the beam projector;

FIGS. 24–25 and FIGS. 26–27 are respectively perspective views of two further embodiments.

DETAILED DESCRIPTION OF THE DRAWINGS

Figures 1, 2:
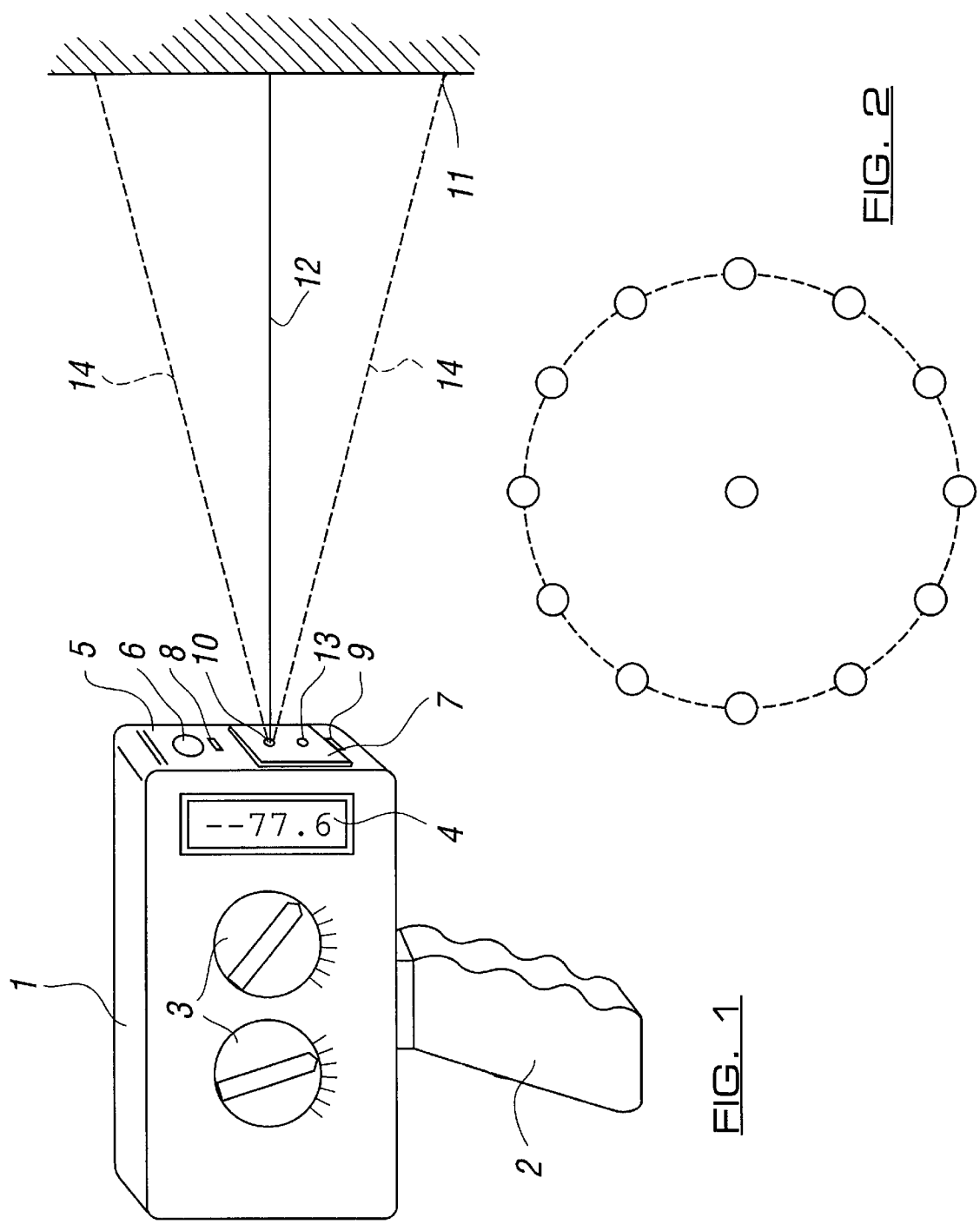
FIG. 1 is a perspective elevation of a measuring instrument, for example a pyrometer, utilised for measuring, at a distance, the temperature of a selected area of a target.
FIG. 2 is a diagram to show a single central light spot which is produced in a first phase of operation of a beam-changing device on the measuring instrument, and also a circle of twelve circumferentially spaced light spots, of lesser intensity, produced during a second phase of operation of the beam-changing device.

In FIG. 1 of the drawings there is shown a hand-held temperature measuring instrument, designated generally by reference numeral 1, intended for pointing at a target so as to determine, at a distance, the temperature of a selected target area. The instrument has a handle 2, selector switches 3 for changing ranges of readings, and a digital read-out screen 4 to indicate temperature.

At the front end 5 of the instrument there is provided a heat-sensitive device 6 which includes means for directing radiation from the target area onto a heat-sensitive element (not shown) within the instrument. Also on the front end 5 there is provided an outlet for a laser beam projector located within the instrument. Over the outlet there is positioned a slide 7 which has stops 8 and 9 which limit its movement in an up and down direction. In the slide 7 there is a first aperture 10 which, when aligned with the beam producer, permits a single central beam, of relatively high intensity, to be projected towards the target 11 as shown at 12.

In the slide 7 there is a second aperture 13 which incorporates a beam splitter serving to split the beam into multiple fractional beams 14 spaced evenly and circumferentially where they strike the target 11.

The slide 7 is arranged to be easily movable by the user of the measuring instrument, say by one finger of the hand holding the instrument.

In another embodiment, not illustrated, the slide 7 is replaced by a beam splitter which can be hinged or rotated into position over the laser beam exit.

Movement of the slide or other carrier for the beam splitter is obtained in further embodiments mechanically or electronically, as distinct from the manual forms shown.

In a further form, changing of the beam splitter means from single-beam to multiple-beams is obtained automatically on a timed basis, either as a one-off operation, or as a repetitive operation, so that in the latter case the user of the instrument will have an automatic change-over from a single central beam, for precise aiming, to multiple beams for illuminating or defining the target area. The timed basis, in a further embodiment, is made variable at the choice of the user of the instrument.

In a further embodiment, the relative lengths of the single-beam operation and of the multiple-beam operation are different, e.g. a short single-beam operation for aiming, followed by a relatively longer multiple-beam operation for defining an area of a target. In a still further embodiment, provision is made for spring-loading the beam changing means into a rest position, i.e. normally to provide a multiple-beam operation, but movable when desired so as temporarily to show the single aiming beam operation.

In different embodiments, the variation of the projection of the laser beam is to patterns rather than a plurality of dots, or to a circle of laser illumination, or a rectangle. The invention is particularly useful in circumstances where the ambient light on the target would make it difficult, or impossible, to see a pattern of individual laser light spots hitting the target area and particularly at a remote location.

In a preferred construction, the device which serves to change the nature of the laser beam has more than two settings, and is, for example, of a rotary nature, say in the form of a turret or knurled disc for ease of operation with the finger.

In still further constructions, substitutable heads are provided, each having different combinations of single-spot and multiple-spot configurations.

In a preferred embodiment, the switch or other control which serves to change the nature of the laser beam projection is a so-called "flip switch". In yet another embodiment, the means for changing the laser beam projection is a series of optical devices disposed on a rotatable turret.

In a still further construction, the pattern of laser light serving to define an area of the target is a continuous line, and there may be two or more such patterns, continuous or interrupted, defining for example an inner area and one or more outer areas of the target.

In yet another arrangement, means for determining the nature of the laser light aimed at the target is carried by a removable member, e.g. a snap-on or screw-on head for mounting on the body of the measuring instrument, or by magnetic fastening.

A primary use of the device of this invention is with a battery-powered hand-held measuring instrument intended for use in one hand.

Figure 3:
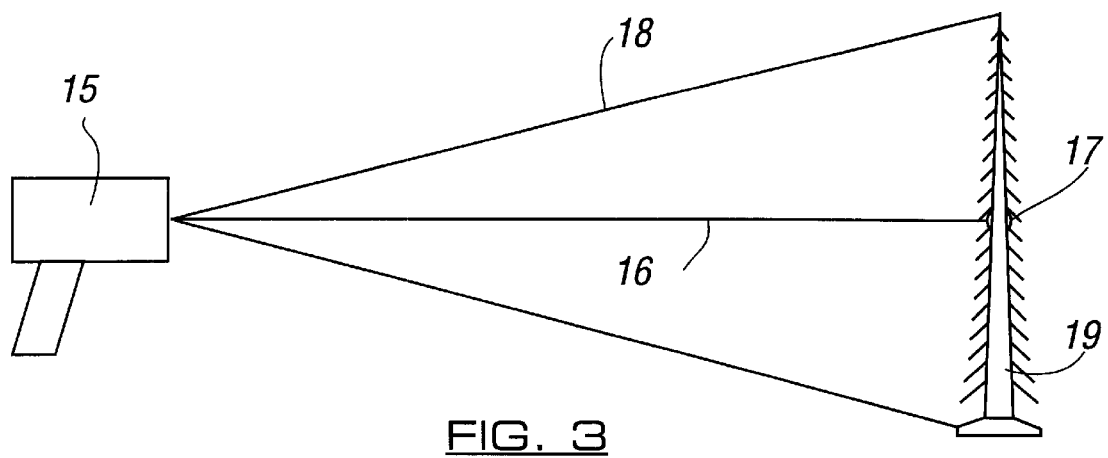
FIG. 3 is a schematic elevation of a laser light projector which can be made to project either or both a single beam, for location on a target, and a plurality of beams for creating a pattern or design on a target.

Referring to FIG. 3 of the drawings a laser beam projector, for example of the kind described with reference to FIG. 1, and here shown schematically at 15, is arranged to project sequentially, at the will of the user, both a single central beam 16 which can be used to aim the projector in correct alignment with a central target 17; and then changed by switching, to provide a plurality of beams which are designated collectively at 18, which produces a pattern 19 on the target, e.g. the simple tree shape shown.

Figure 4A:
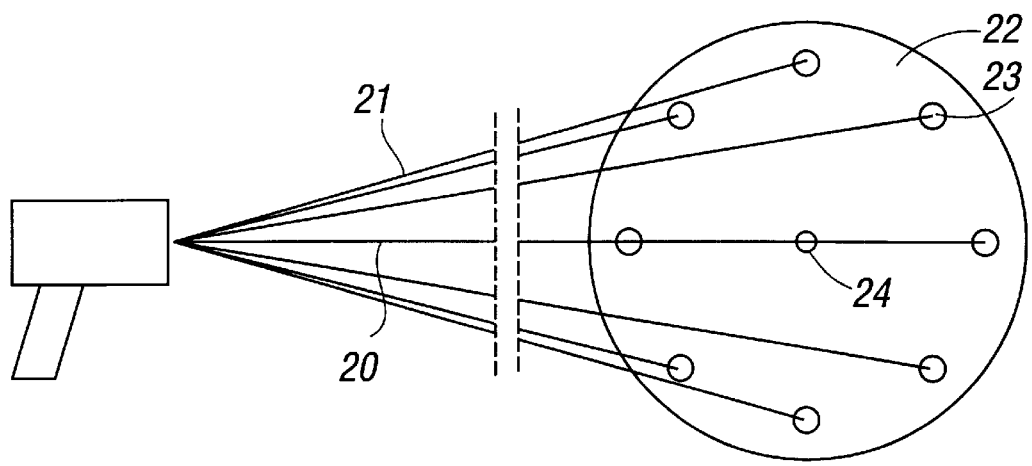
FIG. 4A are respectively a side elevation of a laser light projector, and a front elevation of a target therefor, in which the projector can be made to project both a single beam, for location of a "center" on the target, and a plurality of beams for operation of a locking system.

Referring to FIG. 4A of the drawings a laser beam projector, for example similar to the hand-held device shown in FIG. 1, is arranged to project selectively either a single central beam 20 for aiming and centering purposes, or a plurality of spaced beams 21 arranged in a circle, or any other desired pattern. The projector is intended for use in operating a locking and unlocking system, say for example a television set or a garage door. On the door, or adjacent to it, there is provided a receptor 22 having a plurality of light-sensitive switches 23 arranged in a circle or other pattern corresponding to the pattern of the projector. The user of the projector, such as a driver in a car, aims the projector, using the single brighter central beam, at a center 24 of the receptor 22 and then switches the projector to multiple beam operation, so that each of the switches receives an individual beam, causing the garage door to be unlocked. In other embodiments, different lesser numbers of multiple beams are used, and changed from time to time, so that the user has a "combination" lock which can be varied for greater security.

Figure 5A:
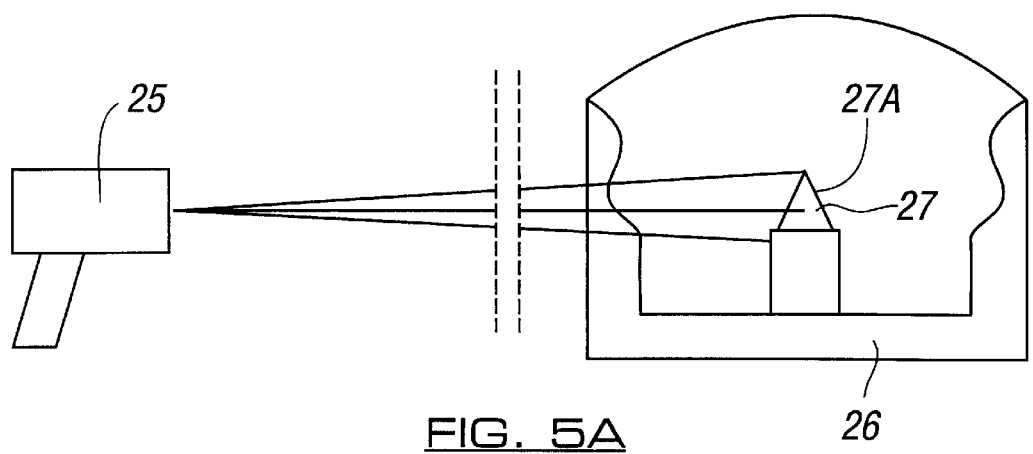
FIG. 5A are respectively a side elevation of a laser light projector and a front elevation of a target therefor, in which the projector can be made to project either or both a centering beam and a plurality of beams for providing a pattern on the target, say a theatrical stage.

Referring to FIG. 5A of the drawings, a projector 25, capable of producing selectively either a single central beam for aiming purposes, or a plurality of beams, serves to permit accurate aiming of laser light in a single beam, to position the projector relative to a theatrical stage 26 by aiming at a point 27 on a part of the stage, and then at the will of the operator can project a pattern 27A or a human figure, e.g. a "ghost", at the desired point of the stage.

Figure 6:
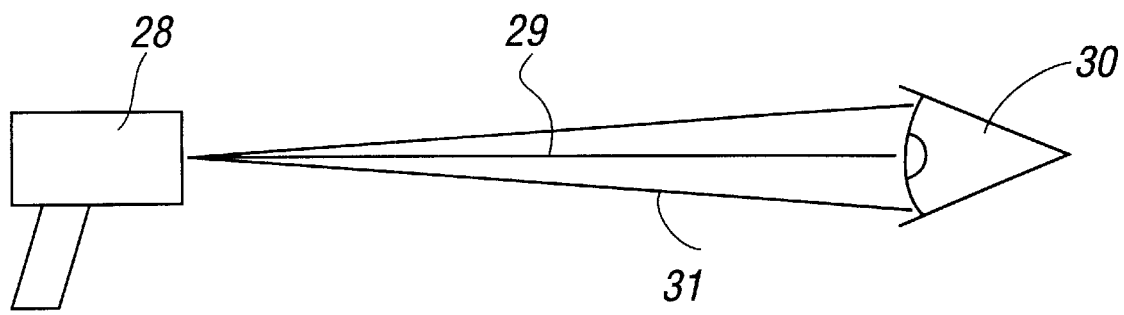
FIG. 6 is a schematic elevation of a laser light projector which is used in surgical and medical fields for the accurate aiming of a single beam and the use of multiple beams for cutting, healing and other curative purposes.

Referring to FIG. 6 of the drawings, a projector 28 is capable of producing a first single stronger laser light beam for centering purposes, and then a plurality of individual beams which are distinct, or merge to strike a defined area. The single beam 29 is aimed for example at a center point of an area to be treated, say a human eye 30, and the projector is switched to produce a plurality of beams 31 to serve for treatment of the visible area which they cover. In each of the examples described with reference to FIGS. 3 to 6, it will be seen that the single central beam, or a plurality of a few relatively stronger beams, are used generally for aiming purposes, and that the larger plurality of relatively weaker beams are then used to provide a desired display on a target.

Figure 7:
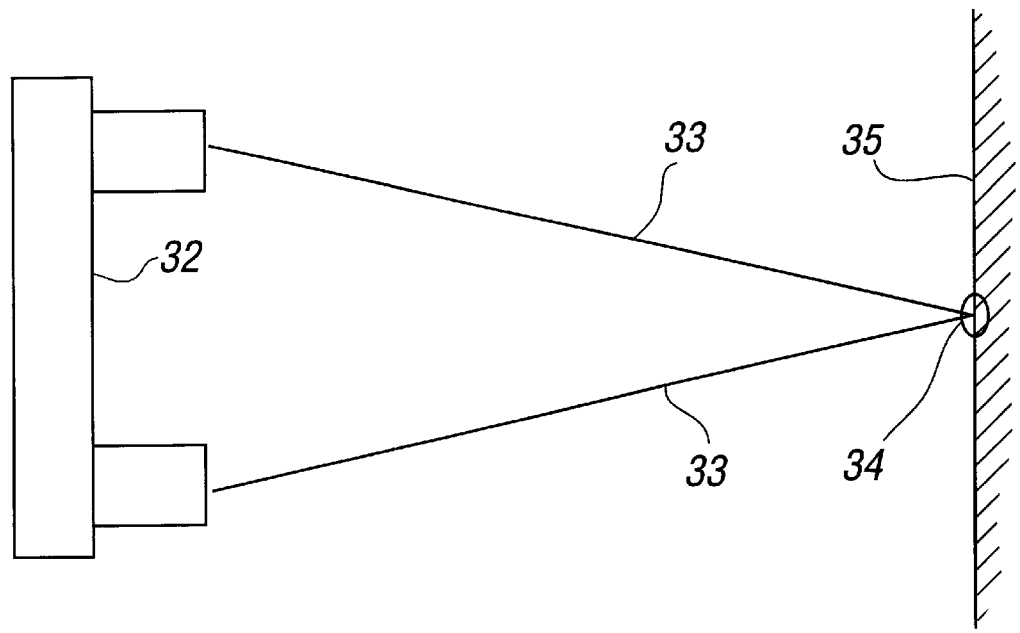
FIG. 7 is a schematic elevation of a laser light projector system having two or more beam sources which can be aimed to cause the beams to coincide on a target to provide ranging of targets.

Referring to FIG. 7, a laser light projector 32 is here shown as a single item, but in a preferred arrangement it is provided in the form of two or more separate instruments suitably positioned and aligned. The projector 32 projects two or more beams 33 in a convergent pattern of which the beam angle can be varied.

Thus, with the beams 33 convergent at a first selected angle, there is a relatively brighter illumination of an aiming point 34 on a target 35, whereas with a different angle of projection of the beams 33 there will be a greater area of illumination of the target centered on the aiming point 34. As the change of angle will be known, the device can likewise be used as a form of range finder. The target 35 could be, for example, a marker let into a road surface or set beside a road, or a buoy for marine purposes, or a marker on an airfield. In each case, there is the advantage that laser light has a very much greater penetrative power than ordinary light, so that use, in mist, or smoke and other obscuring circumstances, is permissible.

Splitting of a single laser beam, used for example for centering and aiming purposes, into a plurality of subordinate beams, used for any of the other purposes described above, is conveniently obtained, in a further construction, by means of a diffraction grating form of beam splitter, but another form of splitter, such as multiple mirrors may be used.

The change-over from a single central aiming beam to a plurality of subordinate beams is obtained at a time and rate determined manually by the user, or obtained automatically by a timed sequencing arrangement in the projector, and the timing and sequencing are adjustable as required, for example by insertion of pre-programmed units into a receptor of the projector. Change-over of the single beam projection to multiple beam projection will, without other intervention, result in the subordinate beams being proportionately weaker than the single beam. In a further construction provision is made to compensate for the relative weakening of the subordinate beams, by arranging that the intensity of the "main" single beam is stepped up appropriately at the time of changing from single to multiple beam operation, preferably, but not necessarily, by the factor of the number of subordinate beams obtained.

Where a pattern of, say, twelve or sixteen "spots" is obtained by the use of a beam splitter, there will be a corresponding lessening of the intensity of the subordinate beams by that factor, and in order to permit the use of a relatively smaller laser, the subdivision of the single aiming beam is reduced, in a further construction, to a much smaller figure, say only six subordinate beams, with at the same time a change of aiming of the subordinate beams on a regular timed basis. For example, where twelve "spots" are required on a target, the laser projector serves to provide only six subordinate beams but at the same time causes them to be projected, as a group, alternately in a first position and then in a second position, or in rotated sequential positions angularly changed from the first position, so that to the user the illusion of twelve "spots" is maintained.

In further modifications of all of the embodiments described above wherein there is a change-over from a single (or multiple) "aiming" beam to a plurality of subordinate beams which define or outline an area or a pattern, the laser projecting means is arranged, mechanically or electronically, to carry out the change-over at a relatively very rapid rate, say twelve or more times per second, so that the strength of the beam can be at its full power, without diminution according to the number of circumferential "spots" or the pattern to be produced, and persistence of vision will enable the user to see the "spots" or pattern at "full" laser strength.

Referring now to FIGS. 8A, 8B, 8C and 8D there are shown a number of methods of carrying out the invention.

Figure 8A:
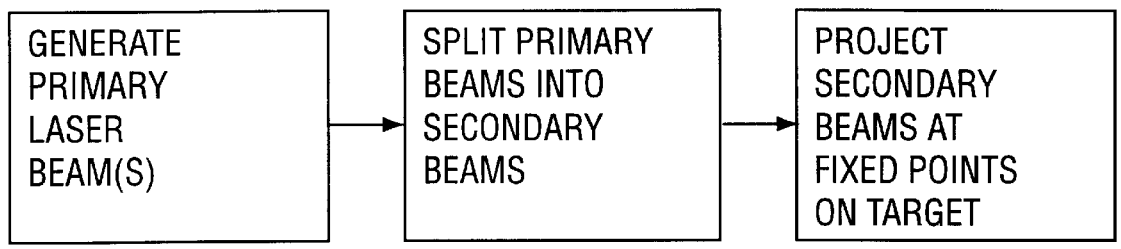
FIGS. 8A, 8B, 8C, and 8D are box diagrams to illustrate methods of carrying out the invention.

In FIG. 8A a single primary beam (or a relatively small number of primary beams) is or are generated, and the or each primary beam is then split into a number of secondary beams which are then projected to strike a target at predetermined fixed points (i.e. small areas) of the target.

Figure 8B:
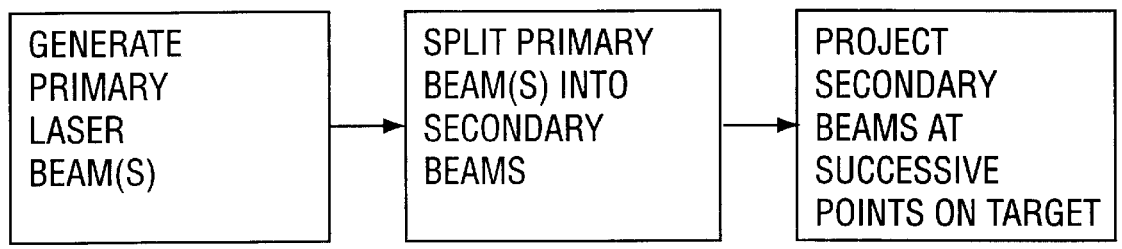

In FIG. 8B a single primary beam (or more than one) is or are generated and the or each primary beam is then split into a number of secondary beams which are then projected in moving manner so as to strike the target at successive points of the target.

Figure 8C:
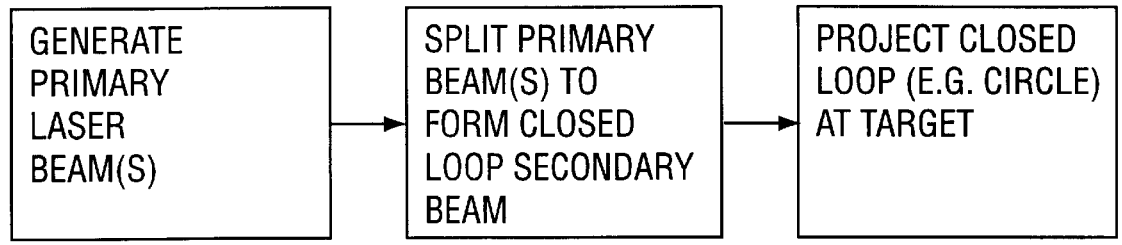

In FIG. 8C a single primary beam (or more than one) is or are generated and the or each primary beam is formed into a closed loop secondary beam, such as a circle, and the or each secondary beam is projected so as to strike the target. Where more than one such closed loop secondary beam is formed, e.g. circles, preferably one is placed inside another, e.g. concentrically.

Figure 8D:
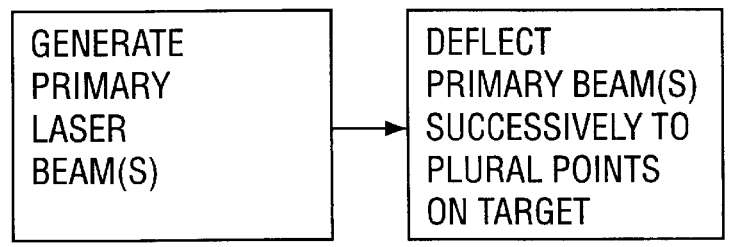

In FIG. 8D a single primary beam (or more than one) is or are generated, and the or each primary beam is deflected successively to each of a number of small areas of the target, and particularly at a high rate sufficient to give rise to persistence of vision. In each of the above described methods, the primary beam (or beams) generated in the first box of the respective FIG. 8A, 8B, 8C or 8D is firstly directed at the target for aiming purposes, whereas the secondary beams generated in FIGS. 8A, 8B and 8C, and the deflected primary beam(s) of FIG. 8D, strike the target so as to outline an area of the target.

In further variations of the methods described with reference to FIGS. 8A, 8B, 8C and 8D, the pattern or number of small areas, or plural closed loop figures, defined on the target is made subject to variation in number and/or shape, at the will of the user, so as to result in a form of "coding", for example when the target has areas sensitive to laser light and certain ones of which need to be exclusively activated for operation of a mechanism such as a lock or machinery activator.

Figure 9:
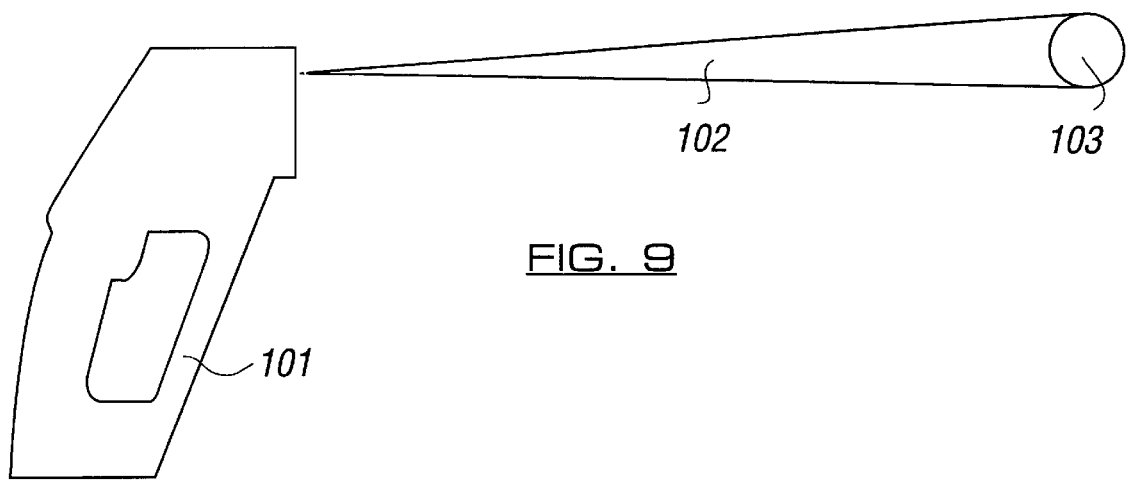
FIG. 9 is a side elevation of a known laser projection apparatus which, for convenience of handling, is made in the form of a "pistol"

Referring to FIG. 9 of the drawings there is shown a side elevation of a known kind of pistol-type hand-held laser beam projector 101 which is arranged to project a laser beam 102 towards a desired target (not shown), the beam being of a slightly divergent nature so as to result in the formation on the target of a circular area or spot 103 which indicates visually to the user an accurate location on the target, for example a selected area of a heated surface.

Figures 10, 11:
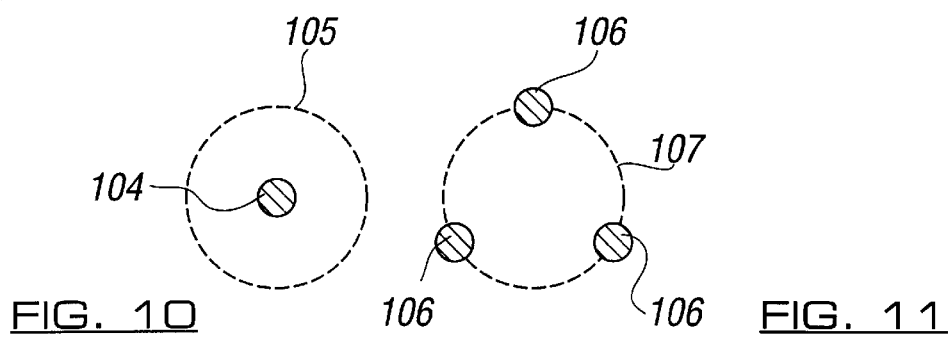
FIG. 10 shows the formation on a target of a single laser beam "spot" which is centered on a target area or an energy zone represented by a circle in broken line.
FIG. 11 shows the formation on a target of a plurality of such spots located on a circle outlining the energy zone.

Referring to FIG. 10 of the drawings there is shown a front elevation of a spot 104 as it appears centrally on the target, for example to permit the user to locate the spot 104 at the center of a target area 105

Referring to FIG. 11 of the drawings, it is useful to be able to define an area of a target by the use of more than one such spot, for example by the use of three spots 106 arranged on the periphery 107 of a target area. This target area may be, for example, a circle of one foot diameter at a distance of six feet. Where more than one spot is needed, say up to twelve or more, it is necessary to arrange that the single laser beam produced by the beam projecting apparatus is split into the requisite number of separate beams, and hitherto the change between single-beam and multiple-beam operation has necessitated either (1) the provision of separate beam projection devices each manufactured in such a manner as to produce always a single beam, or always a plurality of beams, as the case may be, or (2) the provision of capability of a beam projection apparatus to be dismantled for the removal of a single-beam projection lens system and the insertion of a multiple-beam projection lens system, having a beam splitter, after which the beam projection apparatus must then be re-assembled.

In the first instance referred to above, the user needs to go to the expense and inconvenience of having to provide and keep available two, or more, separate beam projection devices, and to use one or another according to need, which can be time consuming and inconvenient. In the second instance referred to above, the necessity to dis-assemble, modify, and re-assemble the beam projection apparatus necessarily militates against being able to make rapid changes from one kind of single-spot or multiple-spot arrangement to another.

Figure 12:
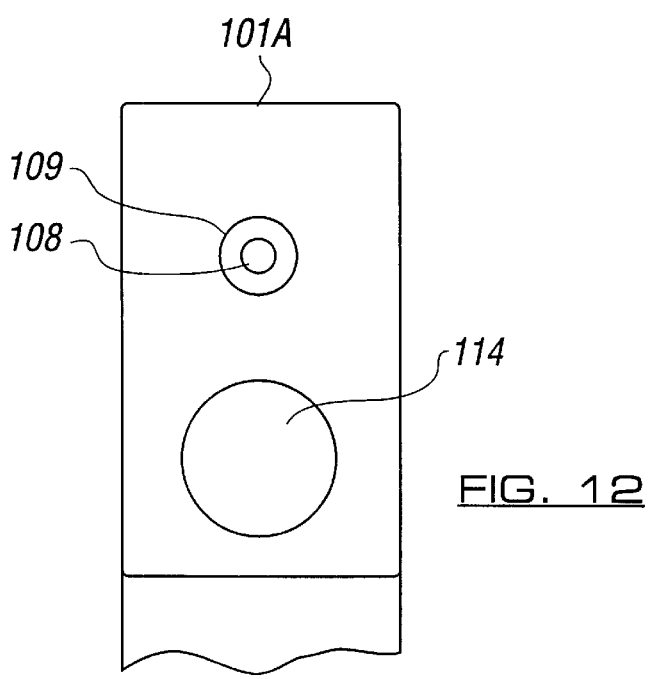

Referring now to FIGS. 12 and 13 of the drawings, the hand-held laser beam projector 101A has an internal laser beam production unit 108 which is disposed centrally within an internally threaded circular opening 109. Without any modification, the beam projector 101A will produce, through the opening 109, a single central laser beam which can be used, for example, in the manner described above with reference to FIG. 10. To permit the beam projector 101A to be used for the projection of a number of beams there is provided a beam production member 110 shown in FIG. 13. This member incorporates a known beam-splitter lens 111 which directs forwardly a plurality of beams 112, for use for example in the manner indicated with reference to FIG. 11 above. The beam production member 110 has a threaded boss 113 which is engaged and tightened by hand into the threaded opening 109, so that the change-over between single-beam and multiple-beam operation is a simple manual operation taking only a few seconds to accomplish. In another embodiment, not shown, the screw-thread on the boss 113 is omitted and the boss is dimensioned relative to the opening 109 so as to be a frictional push-fit therein, with or without a resilient collar or spring-loading to keep it firmly in place. Referring to FIGS. 14 and 15 of the drawings, the hand-held laser beam projector 101B has an internal laser beam production unit 108 which is disposed so as to project a single central beam through hole 115. In FIG. 14, the detector 122, lens 121 and opening 114 are shown in axial alignment.

Figures 16, 17:
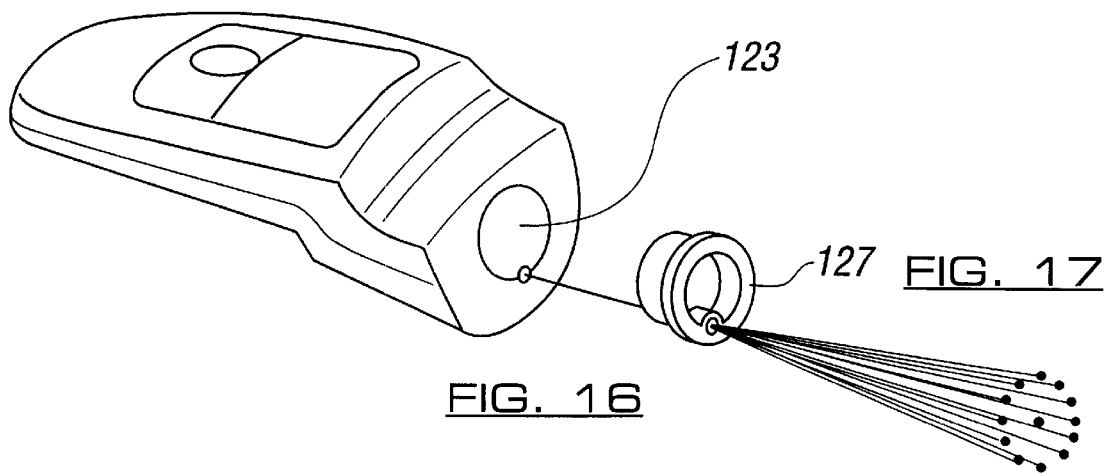
FIGS. 16, 17 and 18 are respectively perspective views of another embodiment shown in separated view, and in assembled view, using a push-fit adaptation instead of being threaded into the laser opening.
Figure 18:
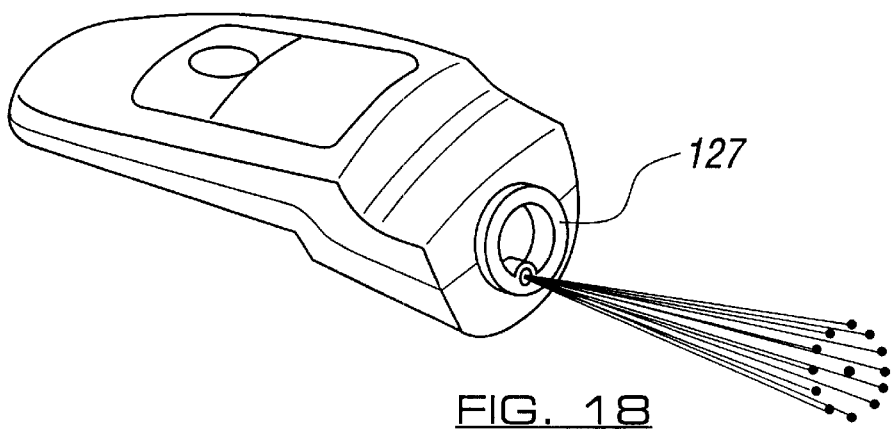

Referring now to FIG. 15 there is shown, in perspective view, a beam production member 116 which is U-shaped, one leg of the "U" having an open-ended slot 118 which is formed to be a sliding fit over the neck 115A. The other leg 119 of the "U" has an opening containing a known beam-splitter lens 120 which, when the beam production member 116 is pushed fully into position by engagement of the slot 118 on the neck 115A, causes the beam-splitter lens 120 to be accurately centered on the axial line of the beam producer, again resulting in the production of a plurality of beams which can be directed onto the target to define an area thereof. Attachment and removal of the beam production member 116 needs only a simple hand operation taking only a few seconds. In further embodiments of the constructions of FIGS. 12 and 13, and FIGS. 14 and 15, they are made so as to permit a required adjustment of movement of the beam splitter lens towards and away from the beam source, for adjustment of the diameter of the circle of spots obtained. In another embodiment, see FIG. 16, the beam-splitter lens is carried in a circular support 127 made in resilient form, such as a lens cap, (FIG. 17) and inserted into the lens opening 123 in FIG. 16, as shown fully assembled in FIG. 18.

Figure 21:
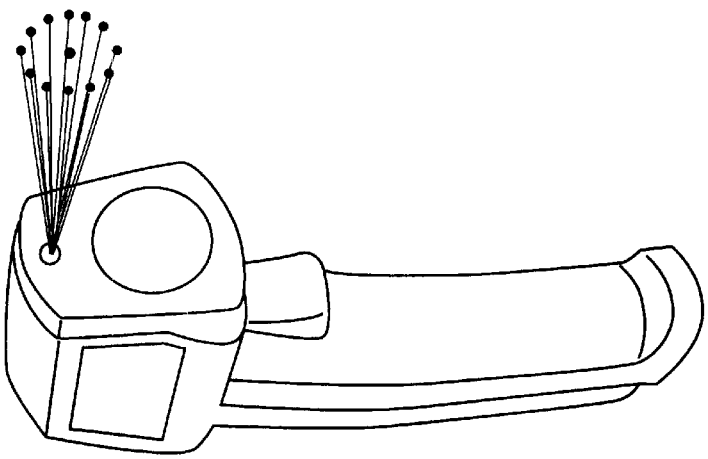
FIGS. 19, 20, and 21 are respectively perspective views of yet another embodiment.
Figure 20:
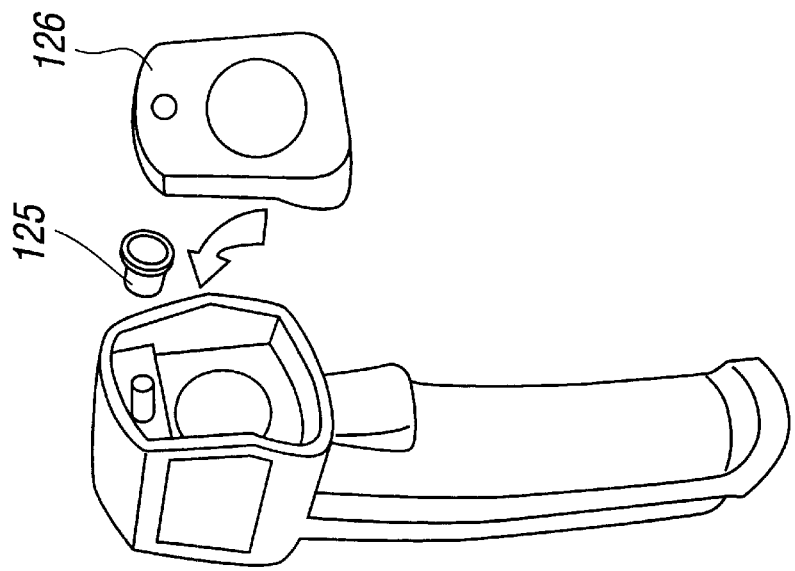
Figure 19:
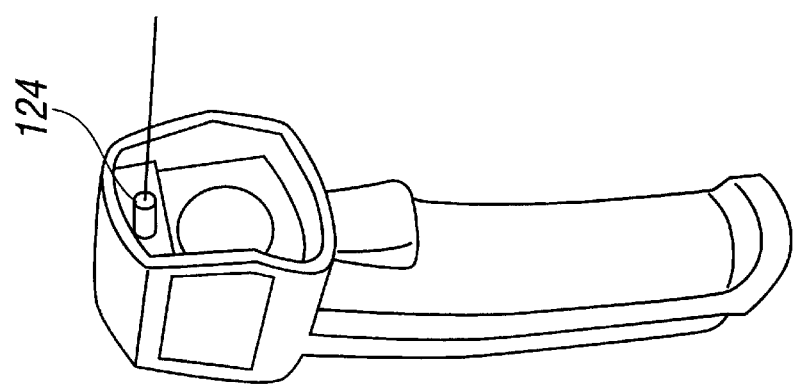
Figure 22:
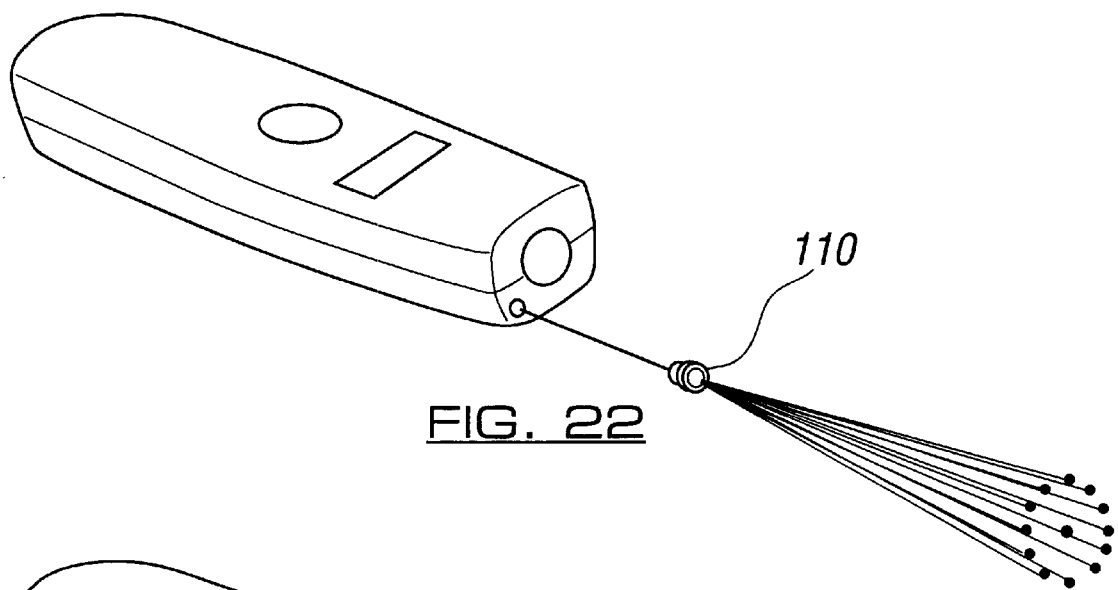
FIGS. 22 and 23 are perspective views of a further embodiment, seen respectively in separated and in assembled condition.
Figure 23:
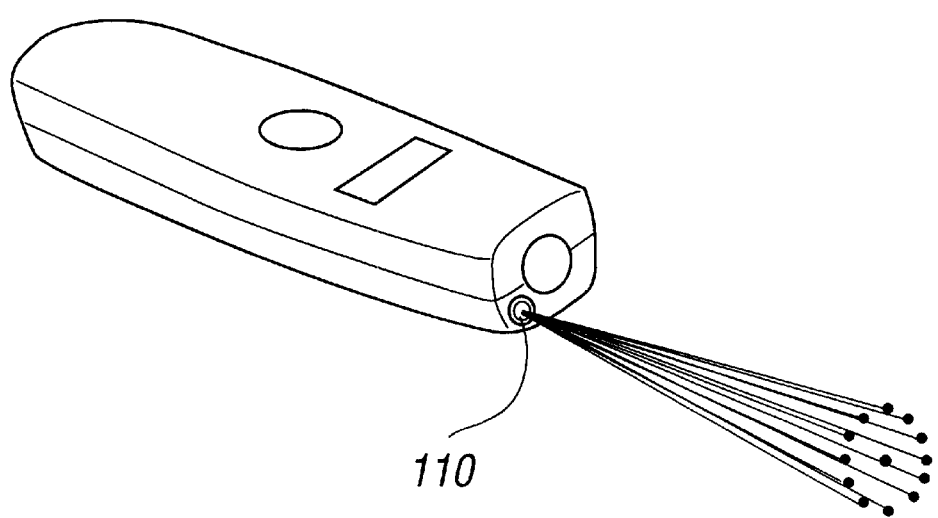
Figure 27:
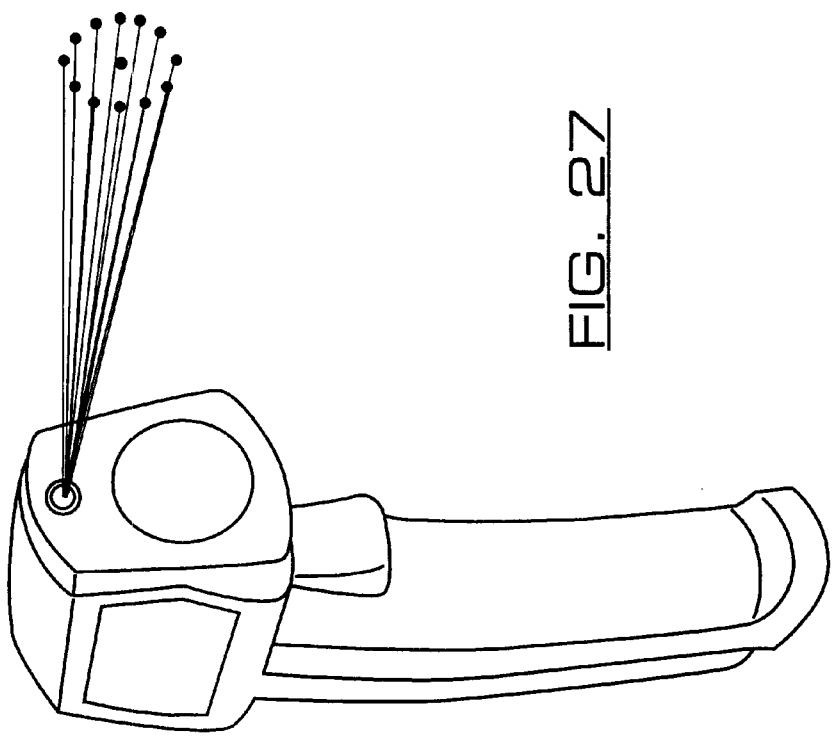
Figure 26:
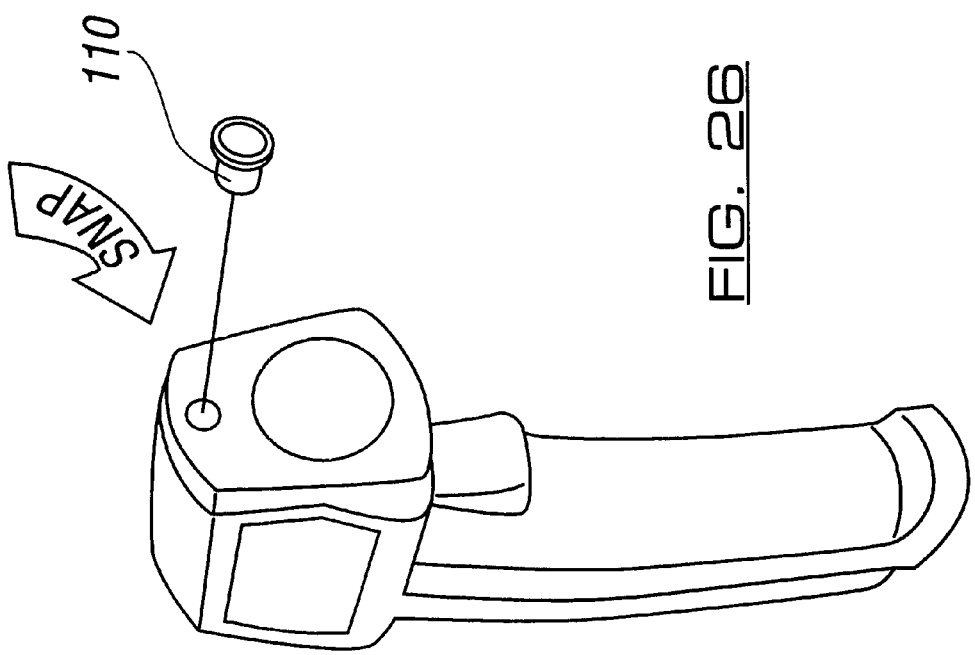

FIGS. 19, 20 and 21 show a further embodiment of an existing device wherein the beam-splitter 125 can be inserted directly over the laser production unit 124 by removing the protective snap-off cover 126 and quickly re-assembling the device as shown in FIG. 21.

FIGS. 22–23, 24–25, and 26–27 show respectively three further embodiments wherein the beam-splitter member 110 is separated from the laser projector, and again where the beam-splitter member 110 is installed in the projector and produces a plurality of beams.

For manufacturing and sale purposes, all of the removable and attachable beam production members of a like kind are selected for a particular supplier of radiometers so that the area:distance ratio referred to above is compatible with the performance of the radiometer, and so that the beam production member will fit the radiometer gun and outline the energy zone. In a further embodiment, the means for attachment of the beam production member is a resilient sleeve or collar, similar to a known slip-on pencil eraser, which can slide over a projection on the body of the gun, and in a still further embodiment includes a rubber bumper or boot to protect the lens, similar to a rubber lens cap.

In yet another embodiment, there are provided interchangeable extension links, having any of the disjointable securing means described above, to fit removably to the gun and be positioned between the gun and the beam production means so that all necessary varied kinds of splitting lens or lens system can be fitted at the distal end of the links and at any desired spacing from the gun.

The beam splitter has a diffraction element which in a first embodiment is a grid but which is preferably a diffraction lens made of a plastics material or of glass and fitted or molded into the beam production member which itself is preferably made entirely as a molding. The optics used in the beam production member provide a choice of different area:distance ratios so that the user is given the facility of selecting an optic which will be suitable for the characteristics, e.g. strength of laser, of the radiometer or other instrument on which he intends to use it. Further, the nature of the means of attachment of the device to the radiometer or other instrument is also varied, so that again the intended user can select a device suitable for the instrument on which he intends to use it.

It is a feature of the splitting of the laser beam that the greater the number of separate rays, i.e. "spots", the weaker will be the strength of each spot, so that there is a practical limitation when the spots become too weak to be useful. Higher grades of instruments, such as more sensitive radiometers, have a relatively stronger laser beam so that they permit the use of greater degrees of subdivision of the beam and thus a correspondingly greater number of spots. For example, better commercial grades of radiometer can capture sufficient radiation emitted by a hot target even at distances as great as 20 feet, and can permit the use of a larger number of beam splits, say up to sixteen spots on the target.

In further embodiments of the invention, the beam splitter is arranged to provide laser beam spots not only at the periphery of the target area, but also within the target area, for example at the center.

In a still further embodiment, the beam splitter is arranged to provide dots in shapes other than a circle, for example in the form of a cross.

In the examples of beam production member described above, in a further embodiment of the invention the lens or grid used to provide diffraction is positioned by snapping it into an internal groove of the body of the member.

In the commercial application of the invention, a stockist can carry a wide selection of the beam production members manufactured with different types of structure selected for fitting to a wide range of current radiometers on the market, and for providing a wide range of number of beam spots, say 3, 6, 9, 12 and 16, according to the power of the radiometer laser and the circumstances under which the instrument is to be used, and the purchaser would have the option of selecting for himself the number of spots which would be useful. The invention accordingly provides the great advantage of permitting upgrading of a radiometer at relatively very little expense. There is a factor, in the use of laser light by personnel, which entails provisions directed towards ensuring that eyesight is not damaged by exposure to too strong a beam. There are Regulations and standards which provide different classifications for a product capable of generating a laser beam. There are two laser product classifications that are used in industry in terms of, for example, infra-red temperature measurement:

1. Class 2: The laser power output of the de vice at 20 cm. away and 7 mm. aperture should be less than 1 mW. Wavelength range: 400 to 700 nano-meter.
2. Class 3A: The laser power output of the device at 20 cm. away and 7 mm. aperture should be less than 5 mW. Wavelength range: 400 to 700 nano-meter.

Clearly it is possible to remain within these respective limits by constructing the apparatus to have an appropriate maximum power at the target within those limits for each beam, but there can be circumstances in which the use of maximum legal power for each beam is desirable, e.g. for illumination of a target at a considerably greater distance from the laser, sufficiently for the user to be able to discern the centering on the targer and the definition of an area on the target. As mentioned above, when a single beam, or a small group of beams, is directed at a target, and that beam or small group is subsequently divided into a greater number of beams, for example for the bounding or defining of an area of a target, there is a corresponding numerical reduction in the power of each beam of the greater number of beams at the target.

That numerical reduction may result in the power at the target of each of the greater number of beams being insufficient for the purposes of defining the target area, particularly at a long distance from the laser, or in bright ambient light. In accordance with a further feature of the invention, a measuring or treatment instrument is provided with means for automatically reducing the power of the single beam, or of the components of the small group, so that each of the beams when it strikes the target is within the safety limit. When the change-over from a single beam, or small group of beams, to a larger number of beams occurs, the power is automatically increased, still within acceptable limits, to provide adequate illumination by the larger number of beams on the target area. By way of illustration, in an apparatus where a single centering beam is then switched to become twelve area-defining beams, the change of intensity of each area-defining beam could be upgraded by a factor of twelve. A similar degree of downgrading of power would occur when the area-defining beams are switched back to provide a single centering beam. Thus, although the power utilised at the target in providing the area-defining beams is perhaps twelve times that permitted for a single beam, there is nevertheless no risk of exposure of the eyes to a higher power factor.

Another way in which the power used in each beam, and particularly in the greater number of beams, can vary is to pulse the laser so as to have periods of being "on" and "off", or of lower average power and higher average power, alternately, with the result that a higher power laser can be used in a unit having average optical power output.

Change of the power utilised, from and into the respective factor, is obtained in a further embodiment of the invention by use of attenuator means. By way of example, such an attenuator, in one embodiment, is a member which is movable, say by sliding or twisting, by the operator or by a mechanism controlled by the operator, or set to operate automatically, so as to present different configurations such as patterns, or obscured and non-obscured areas, or areas having varied degrees of attenuation, in the path of the or each beam.

In another embodiment, the attenuator, such as an adjustable iris, is arranged to vary the focus and brightness of an optical device through which the beam, or beams, is or are passed. In a still further embodiment, the attenuator is linked to a beam-changing means so that when the number of subsidiary beams is increased, which would otherwise reduce their individual power proportionately, the power of the main beam, or beams, is increased proportionately. This may result in the original power output of the main beam or beams at the device being greater than the safety limits mentioned above, but the visible output of the apparatus at the target can still remain within the safety limits. In a further embodiment, such an attenuator is incorporated in, for example, a movable member such as a turret or slide linked to a manual change-over control of the apparatus, or actuated automatically and sequenced in synchronism with the sequenced changing over of the single beam to multiple beam operation. The laser light, in another embodiment, is passed through a shutter mechanism which may be automatic or manual. In further embodiments of the invention, the attenuator is a beam splitting system which permits only a portion of a beam to be transmitted, or else is a beam-strength-reducing arrangement such as a partially opaque screen, or an opaque disc centered in a beam.

It is a property of the combination of the human eye and brain that there is retention of a latent image for a short period of time, with the result that for example an illumination which is being pulsed "on" and "off" in sufficiently rapid succession, as in a movie film, may appear to the observer to be a constant illumination. This permits, in accordance with a further embodiment of the invention, the use of a single aiming beam, or a small group of aiming beams, and also permits a number of area-defining beams to be used in a pulsed manner at a rate greater than the memory of the combination of eye and brain, whilst nevertheless giving to the observer an impression of continuous illumination of the target. In particular, where a plurality of separate beams are disposed along a circle or other area-defining figure, in accordance with a further embodiment of the invention they are caused to move step-by-step, or in continuous motion along the area-defining figure whilst being pulsed simultaneously or sequentially "on" and "off" at a rate, so that to the observer the area-defining figure remains constantly illuminated, as a result of the latent image effect. In this embodiment of the invention, for example, a laser of higher power than is otherwise used in a single continuous beam can be pulsed so as to produce a plurality of beams, e.g. twelve beams each having a pulsing rate for one-twelfth of the time of a continuous beam. The viewer's eye retention will, in effect, cause the circle to appear as twelve brighter illuminated spots.

In accordance with further embodiments of the invention, the movement of the plurality of beams is obtained automatically, electrically or mechanically, or by manual actuation by the user of the apparatus, and the pulsing simultaneously and/or sequentially "on" and "off", i.e. the variation of strength is obtained by variation of power used to generate the beams, or by variation of the proportion of beam utilised, for example by a beam-splitting mechanism or a beam-directing mechanism such as a multiple-mirror system, or a masking device with areas of differentiated masking capability.

An aiming beam or beam array is useful in directing medical/surgical/dental/thermal measurement equipment for precise manipulation of remote treatment areas. These include lasers, X-rays, ultrasound, diathermy, cutting/drilling tools, cautery, and injection tools. Precision material treatment tools can also be directed by visible laser light location either manually or automatically, and drilling, cutting, and burning tools and soldering and welding devices can be directed at very small targets.

I claim:

1. A method providing for display selectively alternately firstly a single laser beam for aiming of a handheld instrument at a target, and secondly a plurality of fractional laser beams derived through a diffraction beam splitter from said single laser beam for defining an area of said target, which comprises steps of:
   (a) firstly generating a primary locating laser beam; and
   (b) secondly thereafter splitting said primary beam with a diffraction beam splitter into a plurality of fractional beams for projection simultaneously at selected points to identify an area of said target.

2. A method according to claim 1 which comprises simultaneously:
   a) directing one of said fractional beams to the center of said area of said target and
   b) directing other of said fractional beams to indicate the extent and location of the area.

3. A method according to claim 1 which comprises serially selecting between:
   the projection of only a single primary laser beam to said area of said target and the projection of a plurality of fractional beams directed at selected points defining said target.

4. A method according to claim 1 which comprises splitting said primary laser beam with a diffraction beam splitter into fractional beams.

5. A method according to claim 1 in which fractional beams are projected simultaneously.

6. A method according to claim 1 which comprises interrupting the duration of the splitting of said primary beam to produce alternating fractional and primary laser beam projection displays on said target area to identify and to locate said area.

7. In a method according to claim 1, the improvement in which said single laser beam and said fractional beams are projected onto the target area at separate times.

8. In a method according to claim 1, the improvement in which the relative brightness of the single laser and the split fractional laser beams is modified to produce visible displays of maximum safe brightness of each beam on the target area which protect the safety of the eye of the person aiming the instrument, when either a single beam or a plurality of beams are displayed on the target area.

9. A method for display selectively alternately firstly of a single laser beam for aiming a hand held instrument at a target, and secondly of a plurality of fractional laser beams derived through a diffraction beam splitter from said single laser beam for defining an area of said target, which comprises steps of:
   (a) firstly generating a primary locating laser beam;
   (b) secondly thereafter splitting said primary laser beam into a plurality of fractional beams for projection serially at selected points of said target.

10. A method for display selectively alternately of a single laser beam and secondly of derivative secondary laser beams respectively for aiming of a handheld instrument at a target, and for defining an area of said target, which comprises steps of:
   (a) firstly generating and projecting a primary laser beam onto a target surface; and thereafter secondly
   (b) modifying said primary beam by diffraction to form derivative closed-loop beams for projection at said target to indicate the area thereof.

11. A method of operating a laser beam sighting device which comprises steps of:
   (a) generating at least one primary laser beam,
   (b) deflecting said at least one primary beam to identify a location area of a target surface,
   (c) thereafter splitting said at least one primary beam by diffraction into a greater number of secondary beams of lesser intensity, and
   (d) directing said secondary beams towards bounding areas of said target surface spaced from said location area; the improvement which comprises:
   (e) selectively changing between primary and secondary beam display.

12. In a method of operating a laser beam sighting device which comprises steps of
   (a) generating at least one primary laser beam,
   (b) firstly directing said at least one primary beam to identify a location area of a target surface,
   (c) thereafter splitting said at least one primary beam by diffraction into a greater number of secondary beams of lesser intensity to define a closed loop bounding area on said target surface; the improvement of
   selectively changing between primary and secondary beam display.

13. In a method of operating a laser beam sighting device which displays laser light onto a target surface, the steps of successively:
   (a) generating at least one primary laser beam of relatively brighter visible intensity;
   (b) directing said at least one primary beam towards a measurement area of a target surface;
   (c) dividing said primary laser beam by diffraction onto more than two secondary beams of lesser brightness; and
   (d) directing said secondary beams of lesser brightness to bounding areas on said target surface, the improvement which comprises
   (e) selectively changing alternately between primary and secondary beam display on said target surface.

14. A laser beam sighting device integral with a handheld measuring or treatment instrument comprising:
   (a) a laser beam generator, projecting laser light onto a target surface, and providing a light display on said surface selectable alternately in time between at least one relatively brighter primary beam and a larger number of dimmer sub-beams, derived by a diffraction beam splitter from said primary beam; and
   (b) a movable switch selecting alternate beam displays onto said target surface between said brighter and dimmer beams.

15. In a hand held temperature measurement instrument having
   (a) a body structure; and
   (b) means directing a visible laser aiming beam along a path to form a visible display of light on a target surface area for temperature measurement of said area; and
   (c) a radiometer directed at said area for detection of invisible heat radiation from said area;
   the improvement comprising the combination of said radiometer and a laser beam modifying carrier attachment, mounted together with said radiometer, on said body structure of said instrument, which carrier is movable into and out of a plurality of selectable control positions which present said carrier in the path of said laser beam to modify the display of visible aiming light on said area.

* * * * *